US010728951B2

(12) United States Patent
Martin

(10) Patent No.: US 10,728,951 B2
(45) Date of Patent: Jul. 28, 2020

(54) COMMUNICATIONS TERMINAL, INFRASTRUCTURE EQUIPMENT AND METHODS FOR DISCONTINUOUS RECEPTION, DRX

(71) Applicant: SONY CORPORATION, Tokyo (JP)

(72) Inventor: Brian Alexander Martin, Basingstoke (GB)

(73) Assignee: SONY CORPORATION, Tokyo (JP)

(*) Notice: Subject to any disclaimer, the term of this patent is extended or adjusted under 35 U.S.C. 154(b) by 215 days.

(21) Appl. No.: 15/738,723

(22) PCT Filed: Jun. 30, 2016

(86) PCT No.: PCT/EP2016/065270
§ 371 (c)(1),
(2) Date: Dec. 21, 2017

(87) PCT Pub. No.: WO2017/009053
PCT Pub. Date: Jan. 19, 2017

(65) Prior Publication Data
US 2018/0192468 A1      Jul. 5, 2018

(30) Foreign Application Priority Data
Jul. 16, 2015  (EP) ..................................... 15177128

(51) Int. Cl.
*H04W 76/28* (2018.01)
*H04W 36/00* (2009.01)
(Continued)

(52) U.S. Cl.
CPC ........... *H04W 76/28* (2018.02); *H04W 24/10* (2013.01); *H04W 36/0088* (2013.01);
(Continued)

(58) Field of Classification Search
CPC .. H04W 76/28; H04W 24/10; H04W 36/0088
See application file for complete search history.

(56) References Cited

U.S. PATENT DOCUMENTS

| 2011/0199910 A1* | 8/2011 | Oh ..................... H04W 52/0229 370/241 |
| 2012/0039200 A1* | 2/2012 | Lee ........................ H04W 76/38 370/252 |

(Continued)

FOREIGN PATENT DOCUMENTS

| WO | 2015/036173 A1 | 3/2015 |
| WO | 2015/043958 A1 | 4/2015 |

OTHER PUBLICATIONS

3GPP TSG-RAN #61, RP-131321, "TR 36.872 v1.0.1 Study on Small Cell Enhancements for E-UTRA and E-UTRAN—Physical-layer Aspects", RAN WG1, 2013, 1 page.

(Continued)

*Primary Examiner* — Hashim S Bhatti
*Assistant Examiner* — Abdullahi Ahmed
(74) *Attorney, Agent, or Firm* — Xsensus LLP

(57) ABSTRACT

A communications terminal includes a controller configured in combination with a transmitter and receiver when in a connected mode to control the receiver to operate in accordance with a discontinuous reception, DRX, state, to measure, when in a re-selection mobility management mode of the DRX state, signals received by the receiver from any of one or more infrastructure equipment, and to select, based on the measured signals received by the receiver from any of the one or more infrastructure equipment, one of the one or more infrastructure equipment from which to receive signals transmitted on a downlink. When in a network controlled mobility management mode of the DRX state after predetermined conditions have been satisfied, the con- (Continued)

troller is configured to switch to the re-selection mobility management mode of the DRX state.

13 Claims, 9 Drawing Sheets

(51) Int. Cl.
  *H04W 52/02* (2009.01)
  *H04W 24/10* (2009.01)
  *H04W 88/02* (2009.01)
  *H04W 92/10* (2009.01)

(52) U.S. Cl.
  CPC ........ *H04W 52/0216* (2013.01); *H04W 88/02* (2013.01); *H04W 92/10* (2013.01); *Y02D 70/1242* (2018.01); *Y02D 70/1262* (2018.01); *Y02D 70/21* (2018.01); *Y02D 70/24* (2018.01)

(56) References Cited

U.S. PATENT DOCUMENTS

| | | |
|---|---|---|
| 2012/0275364 A1 | 11/2012 | Anderson et al. |
| 2012/0275365 A1 | 11/2012 | Anderson et al. |
| 2012/0275366 A1 | 11/2012 | Anderson et al. |
| 2016/0212706 A1 | 7/2016 | Kahtava et al. |
| 2016/0242052 A1* | 8/2016 | Kazmi ................ H04W 24/10 |
| 2016/0286419 A1* | 9/2016 | Liu ................ H04W 24/10 |
| 2017/0325164 A1* | 11/2017 | Lee ................ H04W 52/0216 |
| 2018/0042068 A1* | 2/2018 | Sebire ................ H04W 28/18 |

OTHER PUBLICATIONS

Holma, et al, "LTE for UMTS—OFDMA and SC-FDMA Based Radio Access", Wiley 2009, Total 4 pages.
Holma, et al., "LTE for UMTS OFDMA AND SC-FDMA Based Radio Access", John Wiley & Sons Limited, Jan. 2010, Total 8 pages.
3GPP TSG RAN Meeting #67, RP-150182, "New WI Proposal: RAN enhancements for extended DRX in LTE", Qualcomm Incorporated, Mar. 9-12, 2015, Total 7 pages.
3GPP TSG-RAN WG2 Meeting #90bis R2-152342, "Design considerations for extended DRX in LTE", Qualcomm Incorporated, InterDigital Communications, May 25-29, 2015, Total 6 pages.
3GPP Green activities / Energy Saving V0.1.0, Sep. 2012, Total 17 pages.
3GPP TR 37.869 V12.0.0, "3rd Generation Partnership Project; Technical Specification Group Radio Access Network; Study on Enhancements to Machine-Type Communications (MTC) and other Mobile Data Applications; Radio Access Network (RAN) aspects", (Release 12), Sep. 2013, Total 43 pages.
3GPP TSG RAN Meeting #67, RP-150493, "New Wi Proposal: RAN enhancements for extended DRX in LTE", Qualcomm Incorporated, Mar. 9-12, 2015, Total 7 pages.
3GPP TR 23.887 V12.0.0, "3rd Generation Partnership Project; Technical Specification Group Services and System Aspects; Study on Machine-Type Communications (MTC) and other mobile data applications communications enhancements", (Release 12), Dec. 2013, Total 151 pages.
3GPP TSG-RAN WG2 Meeting #90 R2-152638, "Supporting eCDRX in RRC connected state", Alcatel-Lucent Shanghai Bell, May 25-29, 2015, Total 4 pages.
3GPP TS 36.423 V13.0.0, 3rd Generation Partnership Project; Technical Specification Group Radio Access Network; Evolved Universal Terrestrial Radio Access Network (E-UTRAN); X2 application protocol (X2AP), (Release 13), Jun. 2015, Total 209 pages.
ETSI TS 136 331 V10.5.0, "LTE; Evolved Universal Terrestrial Radio Access (E-UTRA); Radio Resource Control (RRC); Protocol specification (3GPP TS 36.331 version 10.5.0 Release 10)", Mar. 2012, Total 306 pages.
International Search Report dated Oct. 20, 2016 in PCT/EP2016/065270 filed Jun. 30, 2016.

* cited by examiner

COMMUNICATIONS TERMINAL, INFRASTRUCTURE EQUIPMENT AND METHODS FOR DISCONTINUOUS RECEPTION, DRX

CROSS-REFERENCE TO RELATED APPLICATIONS

The present application is based on PCT filing PCT/EP2016/065270 filed Jun. 30, 2016, and claims priority to European Patent Application 15 177 128.4, filed in the European Patent Office on 16 Jul. 2015, the entire contents of each of which being incorporated herein by reference.

TECHNICAL FIELD OF THE DISCLOSURE

The present disclosure relates to communications terminals, infrastructure equipment and methods, and more specifically to providing an arrangement in which a communications terminal may operate in accordance with an extended discontinuous reception state (eDRX).

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a number of new infrastructure architectures involving a variety of classes of devices, of wireless access point units and of applications which may require different data rates, coverage areas or transmission powers. Unlike a conventional third or fourth generation communications terminal such as a smartphone, an MTC-type terminal is preferably relatively simple and inexpensive, having a reduced capability. Examples of recent developments include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples include relay nodes which provide assistance to local terminal communicating with a base station.

Whilst it can be convenient to have different systems addressing different needs from different mobile network users, the additions of new infrastructure and new services can also create an infrastructure problem, which is not desirable in a mobile network.

With the continuous growth in data transmitted in mobile networks, continually increasing network capacity comparatively is a problem faced by the industry. There are three parameters which can be changed in order to increase Radio Access network capacity: higher spectral efficiency, more radio spectrum and denser cell layout. The two former of these have limitations on the expected gains over today's LTE, and certainly improvements on the order of magnitude or more are not possible. Thus, in order to meet the stated 1000× capacity targets, small cells are getting a lot of attention [1].

However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications terminals, or when communications between communications terminals are required but the communications terminals may not be within the coverage area of a network. In order to address these limitations, in LTE release-12 the ability for LTE communications terminals to perform device-to-device (D2D) communications will be introduced.

D2D communications allow communications terminals that are in close proximity to communicate directly with each other, both when within and when outside of a coverage area or when the network fails. This D2D communications ability can allow user data to be more efficiently communicated between communications terminals by obviating the need for user data to be relayed by a network entity such as a base station, and also allows communications terminals that are in close proximity to communicate with one another although they may not be within the coverage area of a network. The ability for communications terminals to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area.

Fourth generation networks have therefore been proposed as a cost effective solution for public safety communications compared to dedicated systems such as TETRA which are currently used throughout the world. However, the potential coexistence of conventional LTE communications and D2D communications within a single coverage area or network may increase the complexity of coordinating communications and resource allocation within an LTE network, and may also lead to potential compatibility issues between conventional and D2D capable LTE communications terminals.

It has been envisaged therefore that there is a requirement to perform D2D communications between a group of communications terminals which are outside of a coverage area of an LTE mobile communications network, which may communicate between devices using a repeat request communications protocol or the like.

SUMMARY OF THE DISCLOSURE

According to an example embodiment of the present disclosure there is provided a communications terminal comprising a transmitter, a receiver, and a controller configured to control the transmitter and the receiver to transmit and to receive data via a wireless access interface in one or more infrastructure equipment of a mobile communications network, when in a connected mode. The controller is configured in combination with the transmitter and the receiver when in the connected mode to control the receiver to operate in accordance with a discontinuous reception, DRX, state, to measure, when in a re-selection mobility management mode of the DRX state, signals received by the receiver from any of the one or more infrastructure equipment, and to select, based on the measured signals received by the receiver from any of the one or more infrastructure equipment, one of the one or more infrastructure equipment from which to receive signals transmitted on the downlink. The controller is further configured in combination with the transmitter and the receiver when in the connected mode to measure, when in a network controlled mobility management mode of the DRX state, signals received by the receiver from any of the one or more infrastructure equipment, to generate measurement information based on the measured signals received by the receiver from any of the one or more infrastructure equipment, and to control the transmitter to transmit the measurement information to the one of the infrastructure equipment, wherein the controller is configured in combination with the receiver. When in the network controlled mobility management mode of the DRX state after predetermined conditions have been satisfied, the controller is configured to switch to the re-selection mobility management mode of the DRX state.

In one example, the communications terminal may be configured to operate in accordance with an enhanced discontinuous reception (eDRX) state, in which the communications terminal operates with a similar mobility procedure to the idle mode but whilst able to receive scheduling and dedicated data. The first or second predetermined conditions may comprise a duration timer exceeding a predetermined time, or that there has been no transmission or reception of data for a specified number of eDRX cycles.

The amount of time spent in the eDRX state is used to determine whether the communications terminal should switch between a network controlled mobility management mode and a re-selection mobility management mode controlled by the communications terminal, and accordingly, between connected-mode like handover and an idle-mode like mobility procedure based on cell selection or reselection. Employment of such operation allows the communications terminal to enjoy the benefit of reduced power consumption through the use of eDRX, but whilst maintaining efficient and effective mobility management.

Various further aspects and features of the present technique are defined in the appended claims, which includes a method of controlling communications in a mobile communications system, a first communications terminal forming part of a mobile communications system, a method of operating a first communications terminal forming part of a mobile communications system, a second communications terminal forming part of a mobile communications system, a method of operating a second communications terminal forming part of a mobile communications system, and circuitry for a mobile communications system.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
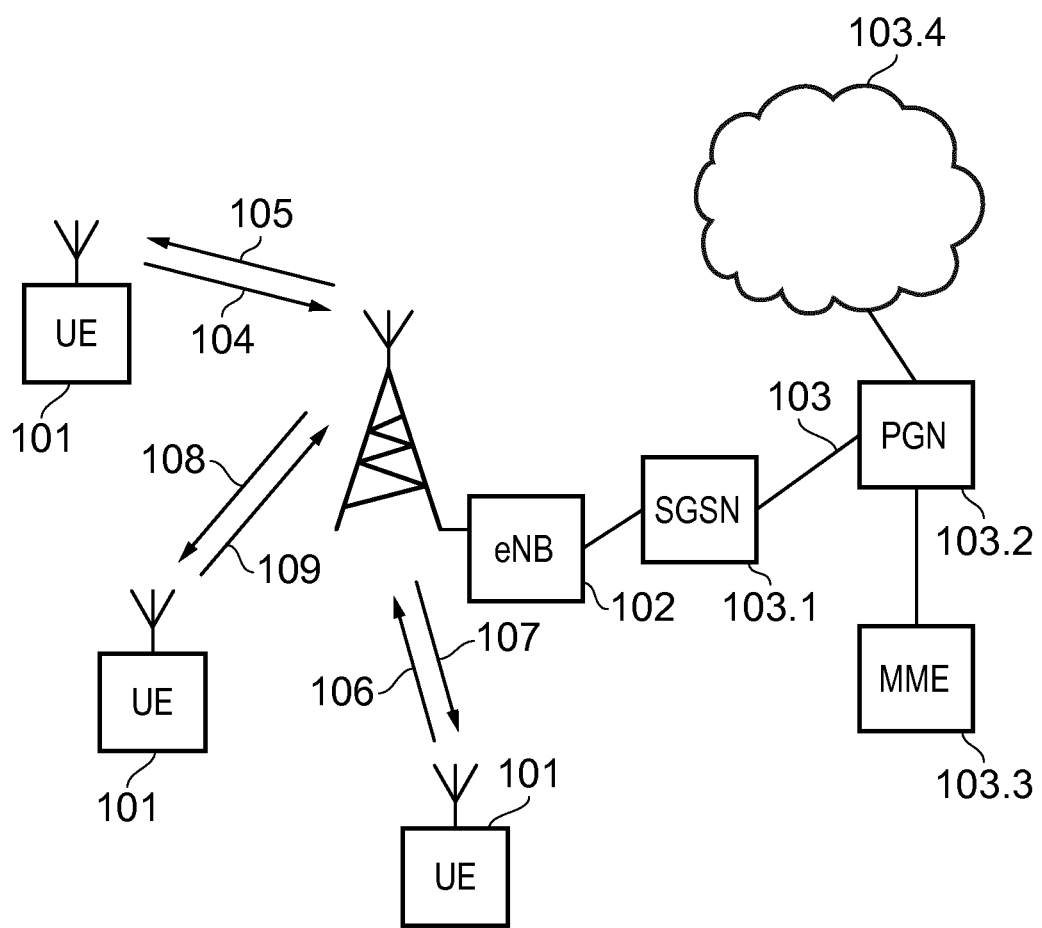
FIG. 1 provides a schematic diagram of a mobile communications system.

Hereinafter preferred embodiments of the present technique will be described in detail with reference to the appended drawings. Note that, in this specification and appended drawings, structural elements that have substantially the same function and structure are denoted with the same reference numerals, and repeated explanation of these structural elements is omitted.

Device-to-Device Communications, Discontinuous Reception and Mobility Management FIG. 1 provides a schematic diagram of a conventional mobile telecommunications system 100, where the system includes mobile communications terminals 101, infrastructure equipment 102 and a core network 103. The infrastructure equipment may also be referred to as a base station, network element, enhanced Node B (eNodeB) or a coordinating entity for example, and provides a wireless access interface to the one or more communications terminals within a coverage area or cell. The one or more mobile communications terminals may communicate data via the transmission and reception of signals representing data using the wireless access interface. The network entity 102 is communicatively linked to core network components such as a serving gateway support node 103.1, a packet data gateway 103.2, a mobility management entity 103.3, and an external network 103.4, which may be connected to one or more other communications systems or networks which have a similar structure to that formed from communications terminals 101 and infrastructure equipment 102. The core network may also provide functionality including authentication, mobility management, charging and so on for the communications terminals served by the network entity. The mobile communications terminals of FIG. 1 may also be referred to as communications terminals, user equipment (UE), terminal devices and so forth, and are configured to communicate with one or more other communications terminals served by the same or a different coverage area via the network entity. These communications may be performed by transmitting and receiving signals representing data using the wireless access interface over the two way communications links represented by lines 104 to 109, where 104, 106 and 108 represent downlink communications from the network entity to the communications terminals and 105, 107 and 109 represent the uplink communications from the communications terminals to the network entity. The communications system 100 may operate in accordance with any known protocol, for instance in some examples the system 100 may operate in accordance with a 3GPP Long Term Evolution (LTE) standard where the network entity and communications terminals are commonly referred to as eNodeB and UEs, respectively.

A brief description of the LTE wireless access interface is explained in the following paragraphs with reference to FIGS. 2 and 3 to support the explanation of the example embodiments of the present technique which are provided in the following paragraphs.

Figure 2:
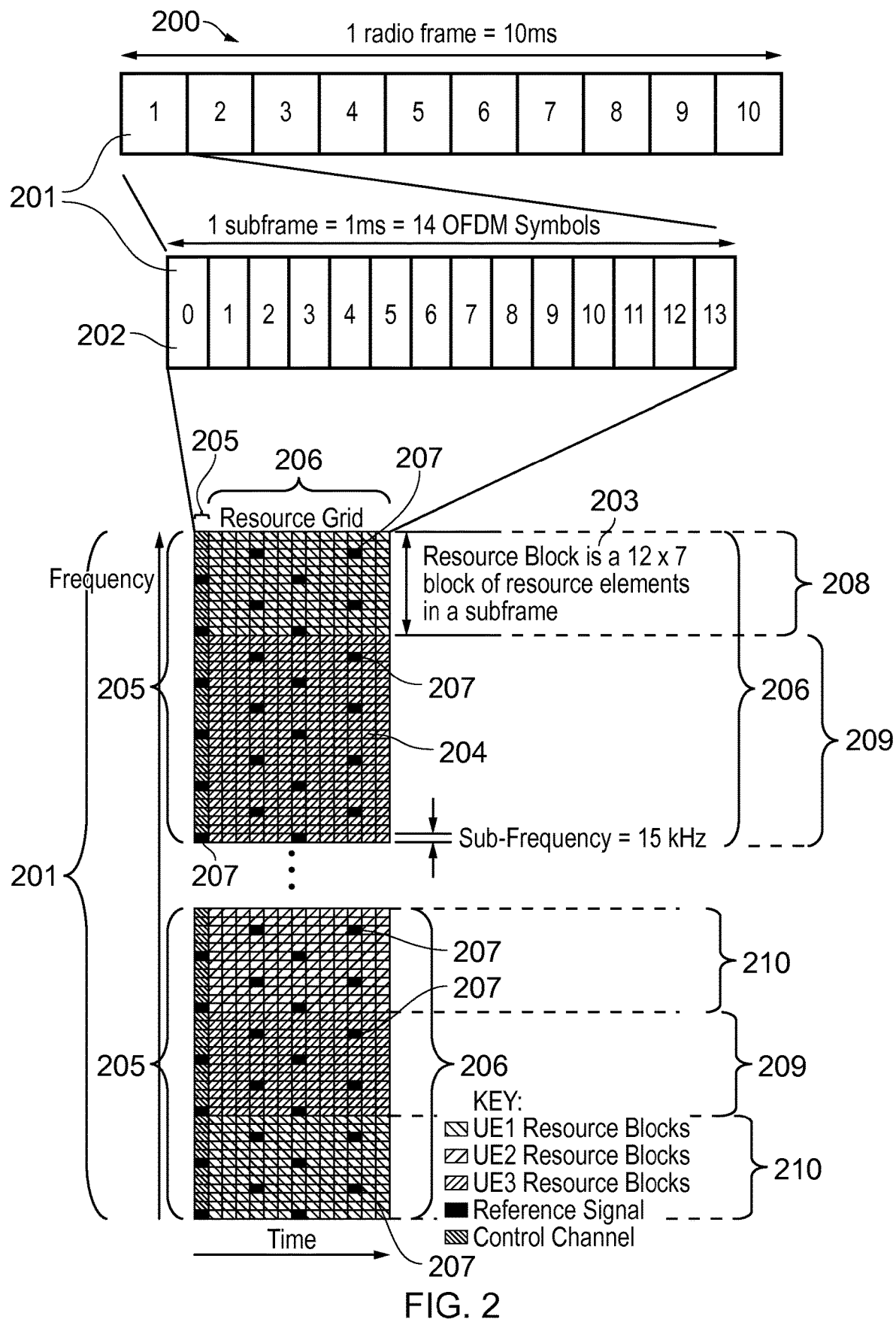
FIG. 2 provides a schematic diagram of the structure of a downlink of a wireless access interface of a mobile communications system.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of intersymbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element.

In the simplified structure of the downlink of an LTE wireless access interface of FIG. 2, each subframe 201 comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink shared channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [2].

Resources within the PDSCH may be allocated by an eNodeB to communications terminals (UEs) being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 2, UE1 has been allocated resources 208 of the data region 206, UE2 resources 209 and UE resources 210. UEs in an LTE system may be allocated a fraction of the available resources of the PDSCH and therefore UEs are required to be informed of the location of their allocated resources within the PDSCH so that only relevant data within the PDSCH is detected and estimated. In order to inform the UEs of the location of their allocated communications resources, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Figure 3:
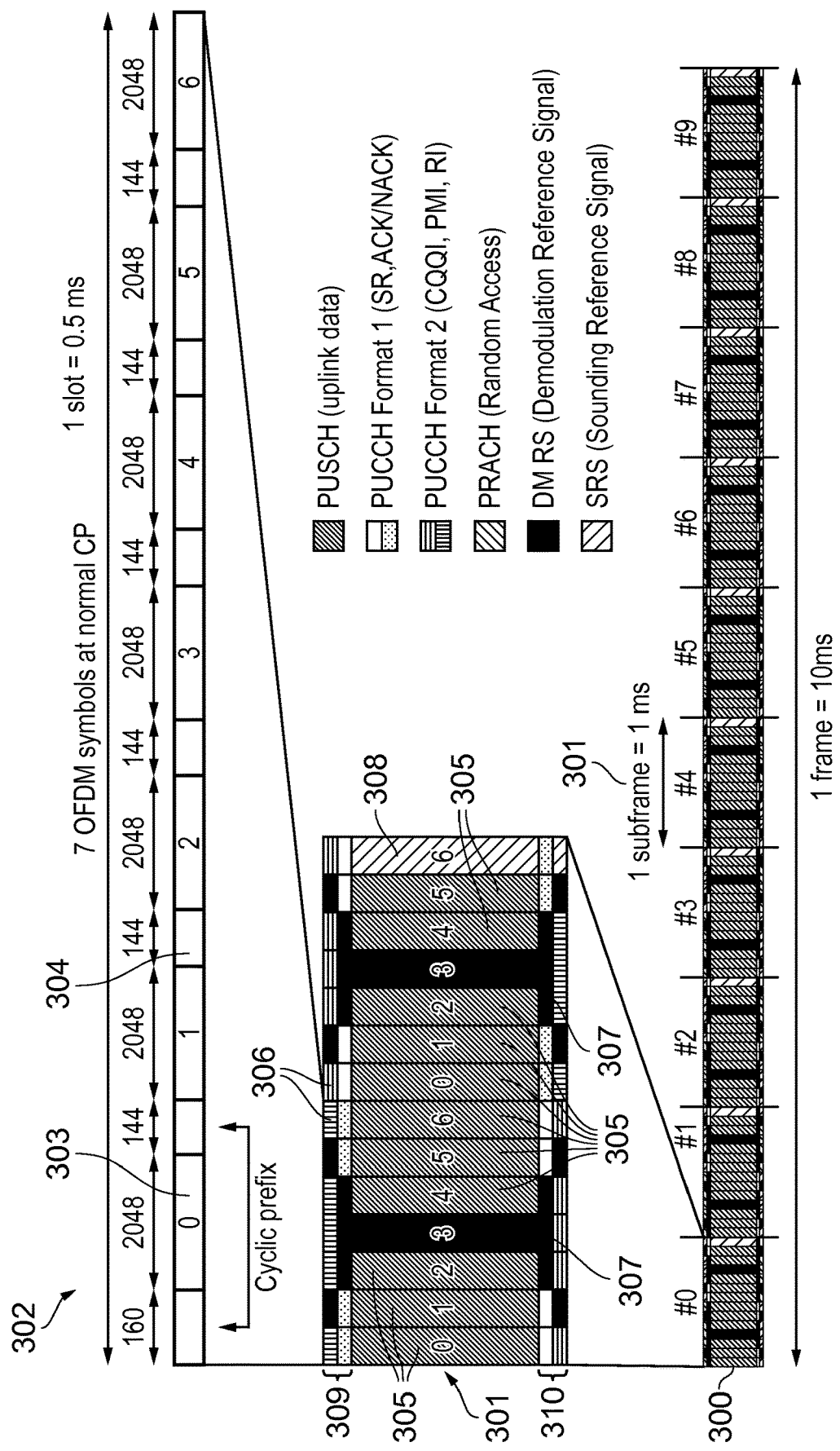
FIG. 3 provides a schematic diagram of an uplink of a wireless access interface of a mobile communications system.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to ten subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes.

Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

D2D communications offer the possibility to address the aforementioned problems of network capacity and the requirement of network coverage for communications between LTE devices. For example, if user data can be communicated directly between UEs only one set of resources is required to communicate the data rather than both uplink and downlink resources. Furthermore, if UEs are capable of communicating directly, UEs within range of each other may communicate even when outside of a coverage area provided an eNodeB. As a result of these potential benefits, the introduction of D2D capabilities into LTE systems has been proposed.

Figure 4:
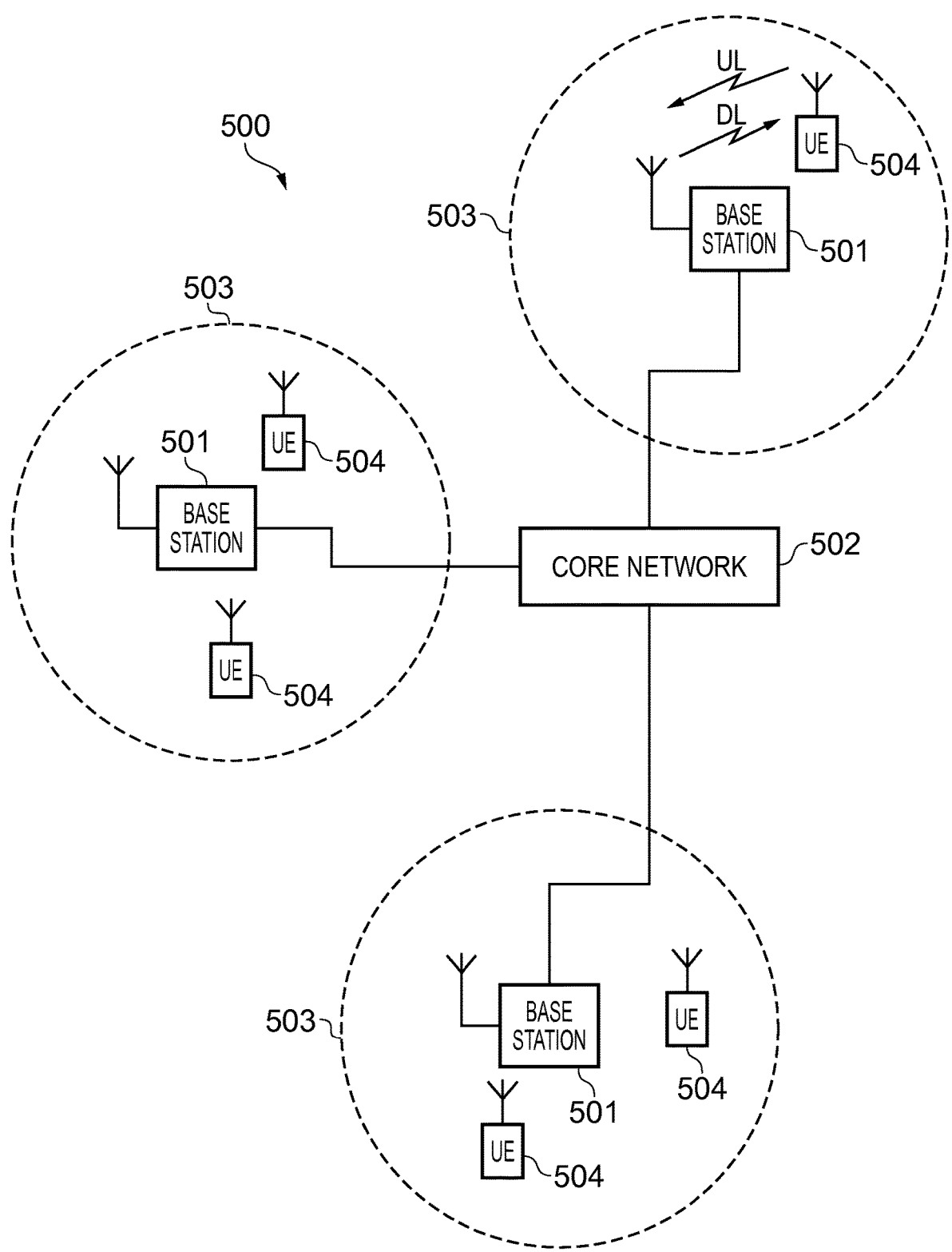
FIG. 4 provides a schematic diagram of a mobile communications system according to an example of an LTE standard.

FIG. 4 provides a schematic diagram illustrating some basic functionality of a conventional mobile communications network, using for example a 3GPP defined UMTS and/or Long Term Evolution (LTE) architecture, which has been simplified with respect to the example in FIG. 1 to support the following explanation. As for the network shown in FIG. 1, the mobile telecommunications network/system 500 of FIG. 4 operates in accordance with LTE principles and which may be adapted to implement embodiments of the disclosure as described further below. Various elements of FIG. 4 and their respective modes of operation are well-known and defined in the relevant standards administered by the 3GPP® body, and also described in many books on the subject, for example, Holma H. and Toskala A [3]. It will be appreciated that operational aspects of the telecommunications network which are not specifically described below may be implemented in accordance with any known techniques, for example according to the relevant standards.

The network 500 includes a plurality of base stations 501 connected to a core network 502. Each base station provides a coverage area 503 (i.e. a cell) within which data can be communicated to and from communications terminals 504. Data is transmitted from base stations 501 to the communications terminals 504 within their respective coverage areas 503 via a radio downlink. Data is transmitted from the communications terminals 504 to the base stations 501 via a radio uplink. The uplink and downlink communications are made using radio resources that are licenced for use by the operator of the network 500. The core network 502 routes data to and from the communications devices 504 via the respective base stations 501 and provides functions such as authentication, mobility management, charging and so on.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The base stations 501 of FIG. 4 may be realised as any type of evolved Node B (eNodeB) such as a macro eNodeB and a small eNodeB. The small eNodeB may be an eNodeB such as a pico eNodeB, a micro eNodeB, and a home (femto) eNodeB that covers a cell smaller than a macro cell. Instead, the base station 501 may be realized as any other types of base stations such as a NodeB and a base transceiver station (BTS). The base station 501 may include a main body (that is also referred to as a base station apparatus) configured to control radio communication, and one or more remote radio heads (RRH) disposed in a different place from the main body. In addition, various types of terminals, which will be described below, may each operate as the base station 501 by temporarily or semi-persistently executing a base station function.

Any of the communications terminals 504 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The communications terminal 504 may also be realized as a terminal (that is also referred to as a machine type communication (MTC) terminal) that performs machine-to-machine (M2M) communication. Furthermore, the terminal apparatus 504 may be a radio communication module (such as an integrated circuit module including a single die) mounted on each of the terminals.

In the present disclosure, a base station providing a small cell is generally differentiated from a conventional base station mostly (and sometimes exclusively) in the range provided by the base station. Small cells include for example the cells also called femtocell, picocell or microcell. In other words, small cells can be considered as similar to macrocells in the channels and features provided to the terminals, but with the use of less power for base station transmissions, which results in a smaller range. A small cell can therefore be the cell or coverage provided by a small cell base station. In other examples, the term small cell can also refer to a component carrier when more than one component carrier is available.

UEs may be configured to operate in accordance with a discontinuous reception (DRX) state, in which they monitor the PDCCH discontinuously to listen for scheduling whilst they are otherwise operating in a manner similar to idle mode. When in the DRX-connected mode, the UE is configured to be able to receive signals for a predetermined portion of a predetermined period, wherein the predetermined period is determined in accordance with a DRX cycle. This is very beneficial to mobile communication systems and UEs in particular in terms of power consumption, as they consume less power when not required to monitor downlink signals continuously. The work item description for Release 13 regarding DRX enhancements (RP-150493) provides a summary of the background [4].

Power consumption is important for UEs using either batteries or an external power supply, and its importance increases with the continued growth of device populations and more demanding use cases. The importance can be illustrated by example scenarios, such as for M2M use cases like sensors that run on battery, it is a major cost to manage the on site exchanging (or charging) of the batteries for a large number of devices, and the battery lifetime may even determine the device's lifetime if it is not foreseen to charge or replace the battery. Even for scenarios where UEs may consume power from an external power supply, it may be desirable to consume less power for energy efficiency purposes.

In Release 12, 3GPP adopted a non access stratum (NAS) layer defined Power Saving Mode (PSM) solution for power consumption enhancement. PSM allows the UE to save battery by negotiating with the network periods for which the UE becomes unreachable, in which case the UE stops access stratum activities. The UE exits this mode when it has mobile originated data pending, or when the periodic tracking area update (TAU) timer expires.

However, PSM has limited applicability for unscheduled Mobile Terminated (MT) data with some requirement on delay tolerance. In this case, the UE would need to negotiate Periodic TAU timer equal (or slightly shorter) than the maximum allowed delay tolerance for MT data. If the maximum allowed delay tolerance is not in the order of many hours, the PSM solution introduces an important increase in signalling due to more frequent periodic TAU procedures. It also suffers in terms of power consumption performance because the UE would be required to "wake up" very frequently in order to perform this signalling. Furthermore, for MT data that is infrequent, most of the wake up procedures would turn out to be entirely unnecessary and thus power inefficient.

A more flexible approach that addresses the scenarios not suitable for PSM, such as the one described above, is to enhance DRX (eDRX) operation. Unlike PSM, DRX makes the UE reachable during pre-defined occasions without resulting in unnecessary signalling.

As currently defined, however, DRX cycles in LTE can at most be 2.56 s and thus would not allow for sufficient power savings for UEs that only need to wake-up infrequently (e.g. every few or tens of minutes) for MT data.

Hence, a DRX cycle extension is required in order to enable significant battery savings for such UEs. Furthermore, the DRX cycle can be set depending on the data delay tolerance and power saving requirements, thus providing a flexible solution for achieving significant UE battery savings.

The general objective of this work item was to provide Radio Access Network (RAN) specifications for extending the DRX cycle in scenarios where mobile terminated data has a delay tolerance in the order of minutes to an hour. The specific objectives were to extend idle mode DRX cycles in order to provide at least an order of magnitude power savings for UEs in idle mode, and to extend connected mode DRX cycles in order to enable additional power savings beyond what is currently possible for UEs in connected mode.

This work of this work item aimed to continue the work started in Release 12 in TR 23.887 and TR 37.869 for Extended DRX. This included identifying the RAN impacts of extending the DRX cycle for both idle and connected mode [RAN2] beyond 2.56 s and up to values to be determined in conjunction with SA2/CT. This also included performing the specification work resulting from the identified impacts on layer 2/3 protocols [RAN2] and RRM core requirements [RAN4].

One of the challenges currently facing employment of DRX for UEs however is mobility management. No connected mode mobility enhancements are considered in this work item, including the current mobility, RRM/RLM procedures apply for UEs using extended DRX cycles in connected mode. Work and cooperation with SA2 will be required, and RAN3 may be involved to work on specification of network protocol aspects, if deemed necessary.

Figure 5:
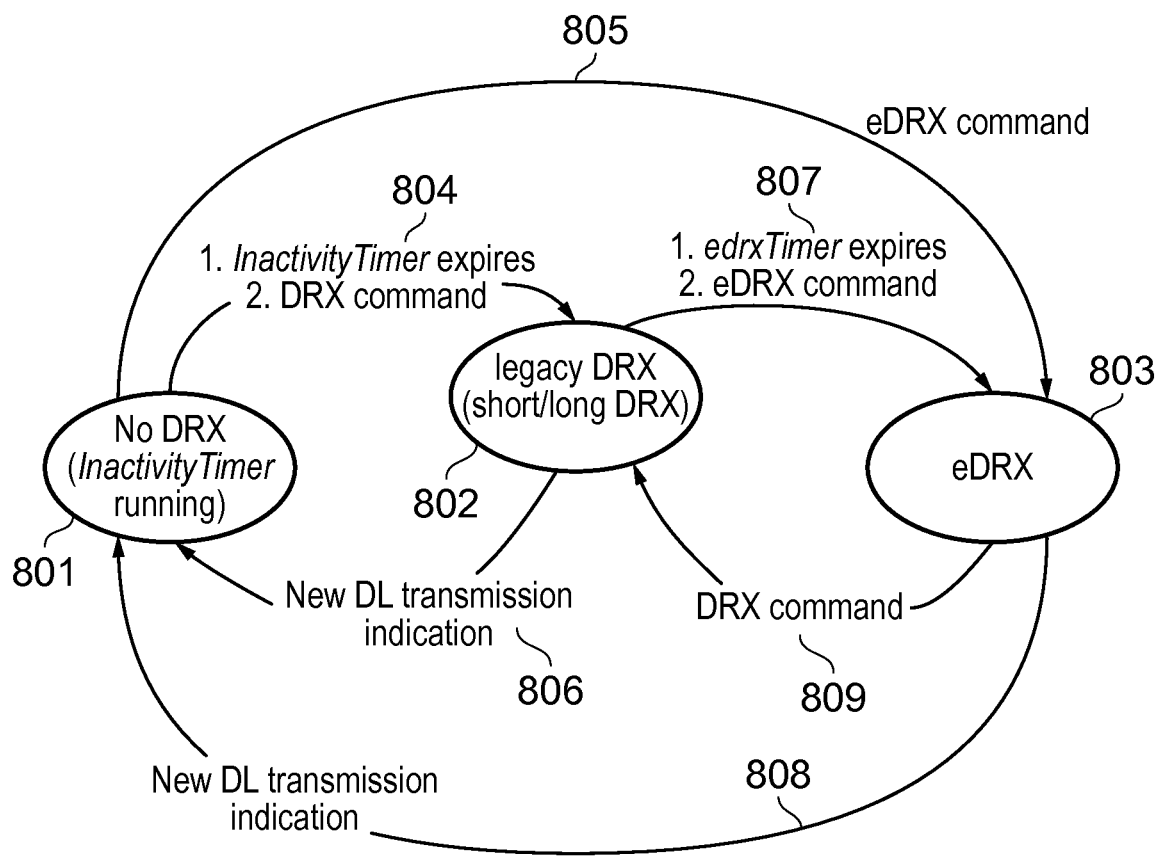
FIG. 5 illustrates the connected mode enhanced DRX (eDRX) states as provided by the RAN2 discussion paper in R2-152342.

The RAN2 discussion paper on design considerations for extended DRX in LTE (R2-152342) [5] provides one potential approach for implementation of extended DRX in the RRC_CONNECTED mode, and this is shown in FIG. 5.

In the implementation of FIG. 5, there are three different states a UE may be in when in the RRC_CONNECTED mode. The first of these is with no DRX operation 801, in which an InactivityTimer is running, and from which two transitions may be made. Should the UE receive a DRX command, or InactivityTimer expires after a certain amount of time without any transmission or reception of data, or a DRX command is received by the UE, a first transition 804 from the no DRX state 801 may be made to a legacy DRX state 802, which is DRX as it is currently implemented in LTE, with either a short DRX or long DRX cycle. However, should the UE receive an eDRX command, or a second inactivity timer expires, then it will make a second transition 805 from the no DRX state 801 into the new, extended eDRX state 803, which does not impact the legacy DRX states (no DRX/long DRX/short DRX).

When in the legacy DRX state 802, a UE may receive an indication that there is a new transmission on the downlink, and should make a first transition 806 from the legacy DRX state 802 to the no DRX state 801. However, should the UE remain in this legacy DRX state 802 for a long enough time without receiving or transmitting any data, then an edrx-Timer may expire, and the UE will make a second transition 807 from the legacy DRX state 802 to the eDRX state 803. Alternatively, the second transition 807 from the legacy DRX state 802 to the eDRX state 803 may be triggered by the UE receiving an eDRX command.

When in the eDRX state 802 a UE may receive an indication that there is a new transmission on the downlink, and should make a first transition 808 from the eDRX state 803 to the no DRX state 801. Alternatively, the UE may receive a DRX command, upon which it will make a second transition 809 from the eDRX state 803 to the legacy DRX state 802.

Although the current work item description states that there should be no impact to mobility, the RAN2 discussion paper which was presented and discussed in RAN2#90 R2-152638 [6] observed that for longer DRX cycles there will be an impact on mobility. The RAN2 discussion was that it may just mean that handover cannot be completed due to not being able to perform frequent enough measurements for a reliable measurement report in time for handover, and the UE has to perform a connection re-establishment upon leaving the extended DRX cycle and finding that radio link failure (RLF) has occurred and that the UE is in a new cell. This is not the most optimal behavior, because of the additional delay for the UE to find that RLF has occurred and to perform a cell selection. In order to minimize this delay it would be beneficial if the UE is able to perform a cell reselection.

To overcome the issue of mobility management in eDRX, whilst still benefiting from the reduced power consumption, it is proposed that a threshold DRX cycle length or amount of time spent in eDRX is used to determine when the UE should switch from performing the "normal" connected mode mobility procedure (i.e. measurements, reporting, handover) to performing an idle mode-like mobility procedure based on cell reselection.

This is advantageous in that it allows the type of mobility to be configured by the network, depending not only on whether eDRX is used, but depending on the length of the DRX cycle. For example, some lower values of eDRX length might still be acceptable for completing handover with a reasonable success rate, whereas longer values may not. A further advantage is that this proposal allows for the reduction of signalling (e.g. handover signalling) in the case of mobility when eDRX is used. Additionally, this also allows further power saving on longer DRX cycle lengths or eDRX duration.

eDRX Time Dependent Mobility Operation

Figure 6A:
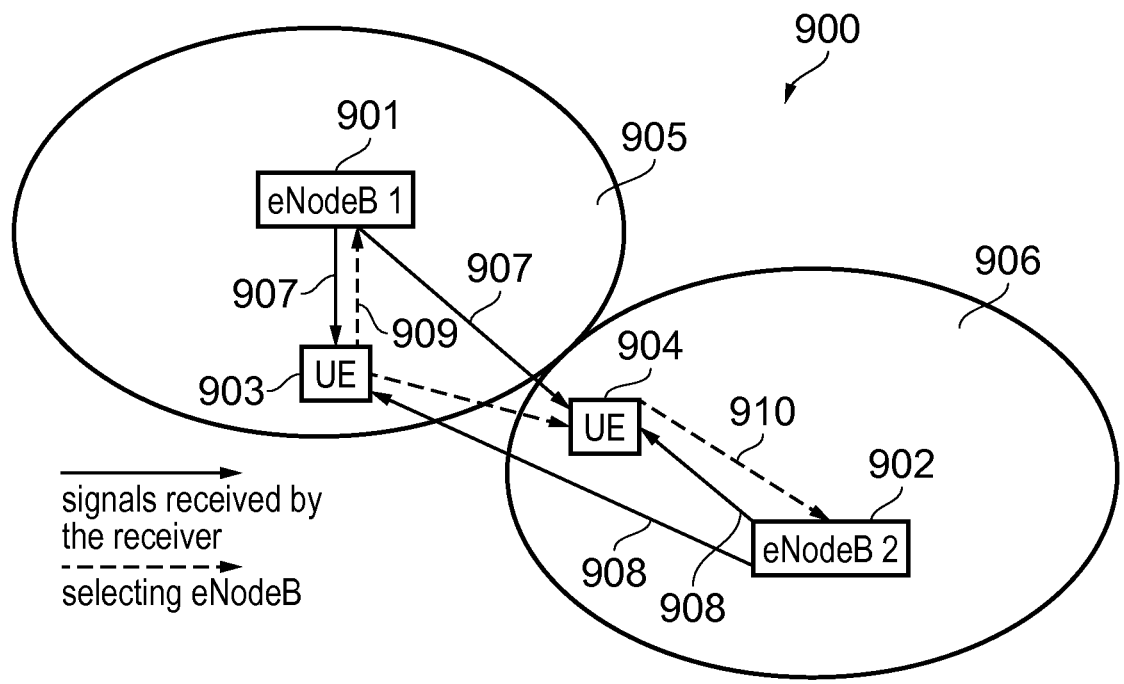
FIGS. 6a and 6b illustrate example mobile communications networks in accordance with the present technique.
Figure 6B:
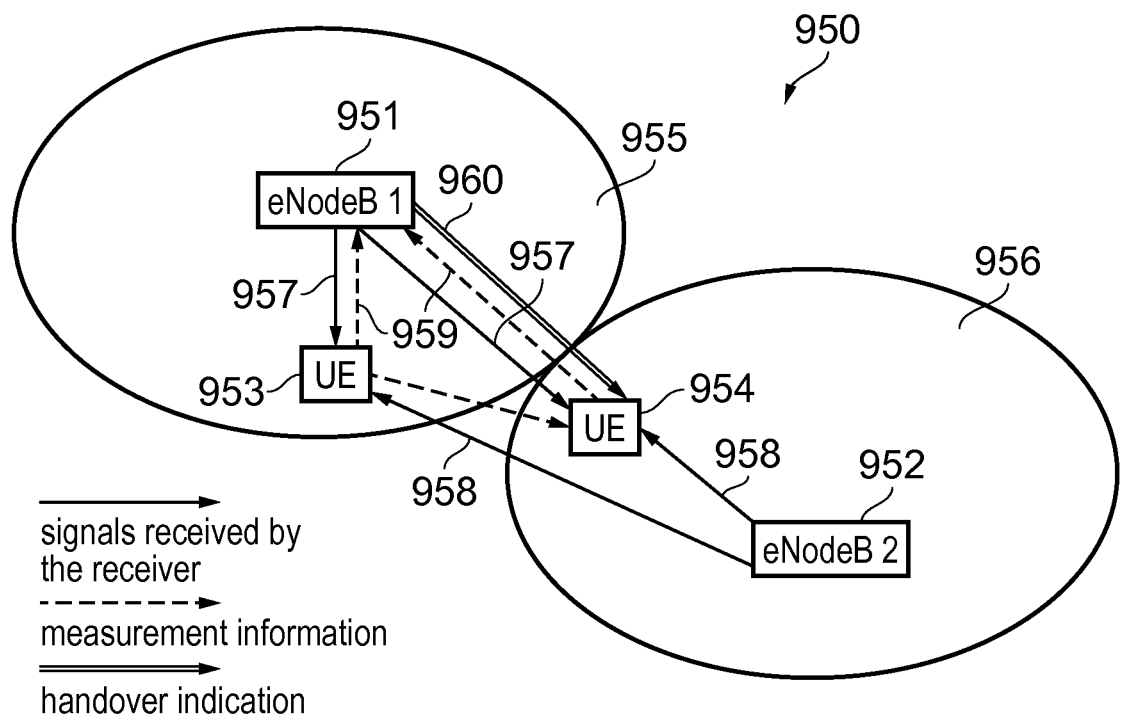

According to an example embodiment of the present disclosure there is provided a communications terminal forming part of a mobile communications network comprising one or more infrastructure equipment. The communications terminal comprises a transmitter configured to transmit signals via a wireless access interface to the one or more infrastructure equipment, a receiver configured to receive signals via the wireless access interface from the one or more infrastructure equipment, and a controller configured to control the transmitter and the receiver to transmit and to receive data via the wireless access interface when in a connected mode. The controller is configured in combination with the transmitter and the receiver when in the connected mode to control the receiver to operate in accordance with a discontinuous reception, DRX, state, to measure, when in a re-selection mobility management mode of the DRX state, signals received by the receiver from any of the one or more infrastructure equipment, and to select, based on the measured signals received by the receiver from any of the one or more infrastructure equipment, one of the one or more infrastructure equipment from which to receive signals transmitted on the downlink. The controller is further configured in combination with the transmitter and the receiver when in the connected mode to measure, when in a network controlled mobility management mode of the DRX state, signals received by the receiver from any of the one or more infrastructure equipment, to generate measurement information based on the measured signals received by the receiver from any of the one or more infrastructure equipment, and to control the transmitter to transmit the measurement information to the one of the infrastructure equipment, wherein the controller is configured in combination with the receiver. When in the network controlled mobility management mode of the DRX state after predetermined conditions have been satisfied, the controller is configured to switch to the re-selection mobility management mode of the DRX state. FIG. 6a illustrates an example mobile communications network 900 in which a communications terminal is operating in accordance with an idle mode mobility procedure in accordance with the present technique, and FIG. 6b illustrates an example mobile communications network 950 in which the communications terminal is operating in accordance with a connected mode mobility procedure in accordance with the present technique.

The mobile communications network 900 comprises a plurality of eNodeBs, although only two eNodeBs 901 and 902 are shown, with coverage areas 906 for eNodeB 1 901 and 907 for eNodeB 2 902, as well as a UE operating in an idle mode, which may be in position 903 inside the coverage area 906 of eNodeB 1 901, or following movement 905, may be in position 904, inside the coverage areas 906 and 907 of both eNodeB 1 901 and eNodeB 2 902. The UE when in position 903 is configured to receive signals 908 from the eNodeB 1 901, and the UE when in position 904 is configured to receive signals 909 from the eNodeB 1 901 and signals 910 from the eNodeB 2 902. Based on measurements of these received signals 908 to 910, the UE when in position 903 is configured to select 911 the eNodeB 1 901 as its serving eNodeB, and the UE when in position 904 is configured to select 912 the eNodeB 2 902 as its serving eNodeB, as the UE is aware that it is moving outside of the coverage area 906 of the eNodeB 1 901, and so, since it is currently operating in the idle mode, must perform a cell reselection.

The mobile communications network 950 comprises a plurality of eNodeBs, although only two eNodeBs 951 and 952 are shown, with coverage areas 956 for eNodeB 1 951 and 957 for eNodeB 2 952, as well as a UE operating in a connected mode, which may be in position 953 inside the coverage area 956 of eNodeB 1 951, or following movement 955, may be in position 954, inside the coverage areas 956 and 957 of both eNodeB 1 951 and eNodeB 2 952. The UE when in position 953 is configured to receive signals 958 from the eNodeB 1 951, and the UE when in position 954 is configured to receive signals 959 from the eNodeB 1 951 and signals 960 from the eNodeB 2 952. Based on measurements of these received signals 958 to 960, the UE when in position 953, and when in position 954, is configured to generate measurement information, and transmit the measurement information 961 and 962 to the eNodeB 1 951, as it is its serving eNodeB. The eNodeB 1 951 does not need to act on the received measurement information 961 from the UE when in position 953, but upon receiving the measurement information 962 from the UE when in position 954, the eNodeB 1 951 is aware that the UE is moving outside of the coverage area 956 of the eNodeB 1 951, and so, since it is currently operating in the connected mode, the eNodeB 1 951 is able to transmit a handover command 963 to the UE when in position 954.

A threshold DRX cycle length or amount of time spent in eDRX may be used to determine whether the UE should switch between different mobility management procedures. A threshold cycle length may be separately provided, for example in the system information of a cell (transmitted from the eNodeB), while the DRX cycle length of extended DRX can vary depending on the value negotiated with a network controller while in connected mode. For shorter DRX cycle lengths the UE would use the normal mobility procedure, while for longer DRX cycle lengths the UE would use another procedure, such as performing a cell reselection with connection re-establishment on the new cell. Although separately provided, the cell might configure the threshold to be the same value as the configured long DRX cycle or the configured extended DRX cycle. However, the flexibility would be there to configure the threshold to some intermediate value in the extended DRX range, or to be configured to be off (equivalent to being the maximum configurable value of the eDRX range).

Figure 7:
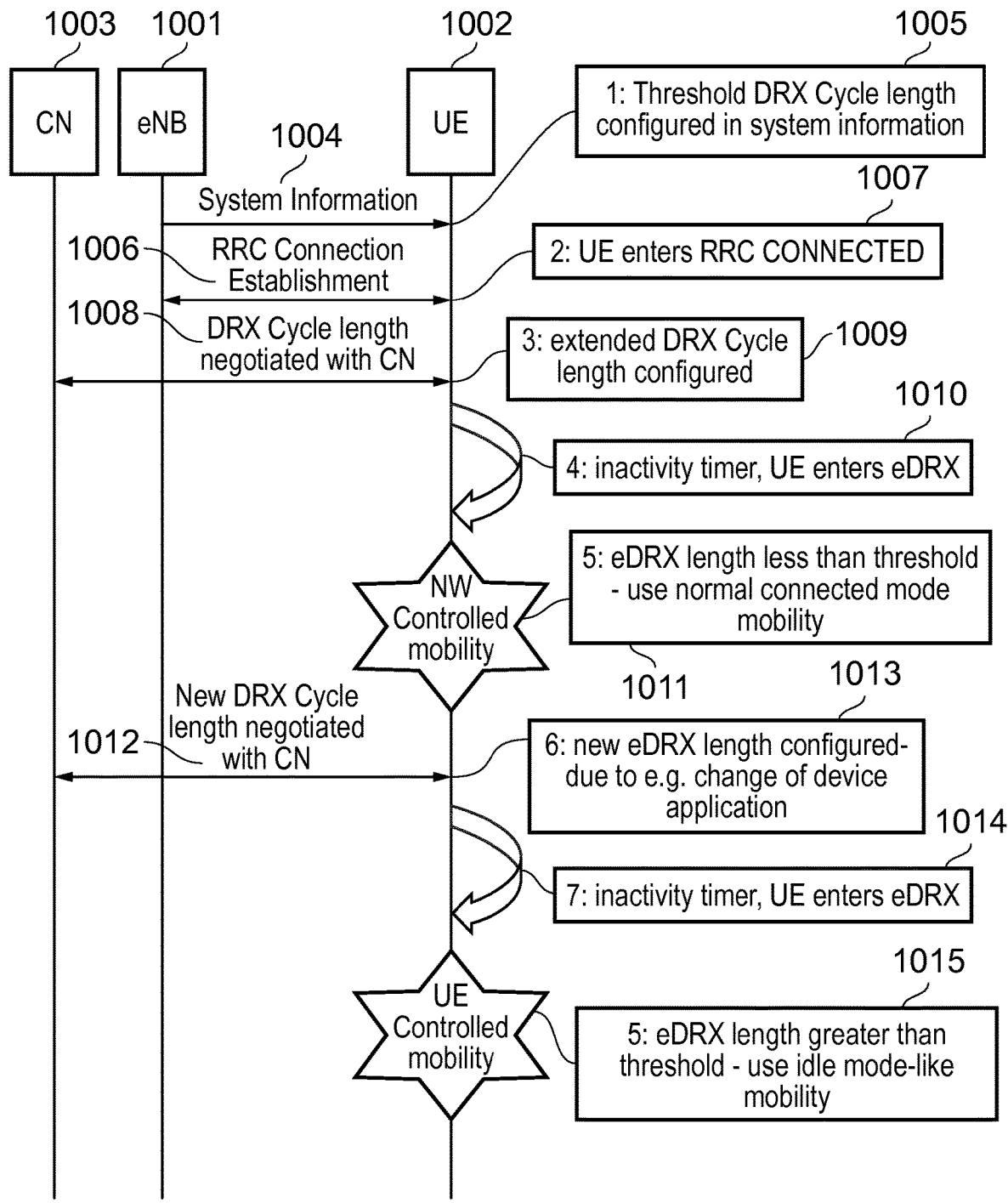
FIG. 7 illustrates an example of eDRX cycle length threshold based mobility switching in accordance with the present technique.

An example of this alternative is shown in FIG. 7. FIG. 7 illustrates an example mobile communications network in accordance with the present technique comprising an eNodeB 1001, a UE 1002 and a network controller 1003. The eNodeB 1001 is configured to transmit system information 1004, which may include a configured threshold DRX cycle length 1005 to the UE 1002. Upon receiving this, the UE 1002 indicates 1006 to the eNodeB 1001 that it is entering an RRC_CONNECTED mode 1007. The DRX cycle length may be negotiated 1008 with the network controller 1003, at which point the extended DRX cycle length is configured 1009.

The UE 1002 at a later point may have not transmitted or received any signals for a specified amount of time, at which point an inactivity timer elapses. At this point, the UE 1002 may enter the eDRX state 1010. It may, for example, be the case that the eDRX length is less than the threshold configured previously 1005, and so the UE 1002 may be configured to use normal connected mode mobility 1011.

The UE 1002 may later negotiate a new DRX cycle length 1012 with the network controller 1003, and configure this new eDRX length due to, for example, a change of device application 1013. The UE 1002 may again not transmit or receive signals for a specified amount of time, at which point an inactivity timer elapses and the UE 1002 enters the eDRX state 1014. This time, however, the eDRX length may be greater than the threshold 1005, and so the UE 1002 may be configured to use idle mode-like mobility 1015.

As an alternative, the threshold may be an amount of time spent in eDRX. For example, the UE may perform the normal mobility procedure for the first N eDRX cycles, then assuming there has been inactivity for an extended period of time, after the first N cycles the UE would switch to using cell reselection based mobility. This would allow the UE to save further power upon detecting an extended period of inactivity (and eDRX) since the measurement requirements are more relaxed for cell reselection based measurements compared to measurements for handover. The duration timer may be configured e.g. in system information, or it might be configured along with the DRX length itself.

Figure 8:
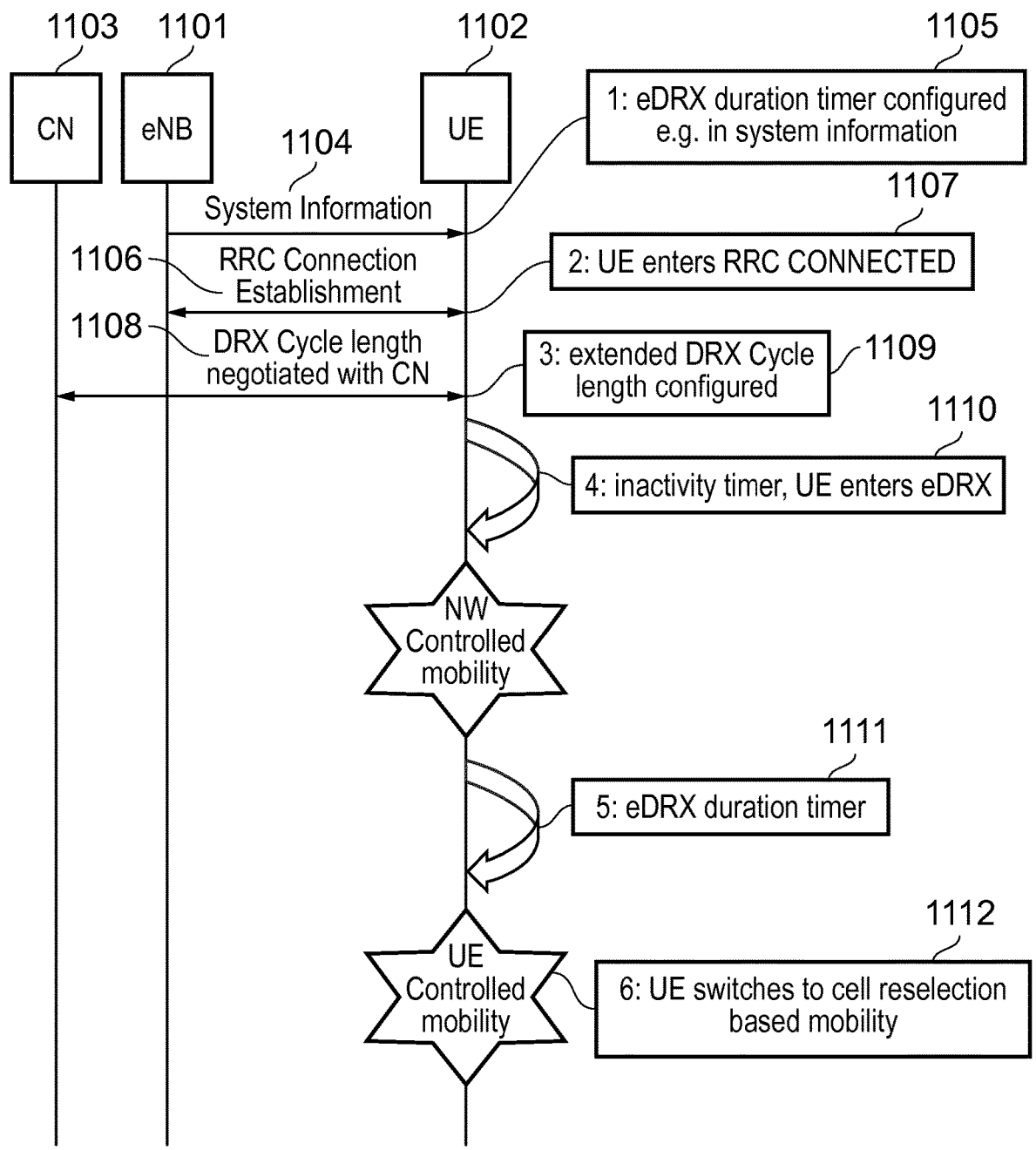
FIG. 8 illustrates an example of eDRX duration based mobility switching in accordance with the present technique.

FIG. 8 illustrates an example mobile communications network in accordance with the present technique comprising an eNodeB 1101, a UE 1102 and a network controller 1103. The eNodeB 1101 is configured to transmit system information 1104, which may include a configured eDRX duration timer 1105 to the UE 1102. Upon receiving this, the UE 1102 indicates 1106 to the eNodeB 1101 that it is entering an RRC_CONNECTED mode 1107. The DRX cycle length may be negotiated 1108 with the network controller 1103, at which point the extended DRX cycle length is configured 1109.

The UE 1102 at a later point may have not transmitted or received any signals for a specified amount of time, at which point an inactivity timer elapses. At this point, the UE 1102 may enter the eDRX state 1110.

The UE 1102 may again not transmit or receive signals for a specified amount of time since it entered the eDRX state, at which point the duration timer elapses 1111 and the UE 1102 may switch to using idle mode-like cell reselection based mobility 1112.

With either example, the introduction of cell reselection while in RRC CONNECTED is needed. Some modification to the connection re-establishment procedure is also needed. Currently the UE performs RRC re-establishment after radio link failure is detected. 3GPP Release 12 provides one solution regarding how this may be realised [7].

For non-stationary UEs, much of the mobility related signalling on the air interface (i.e. measurement reports, handover signalling) can be avoided by using UE controlled mobility. In this solution, the option of using UE controlled mobility in connected mode for UEs with applications generating small and infrequent data transmissions is enabled. With this, the UE can be kept in long term connected mode with minimal overall (connection-establishment plus mobility-related) signalling overhead.

Some necessary optimisation needs to be introduced in the current standard to enable UE controlled mobility. The UE may re-establish the connection potentially in a different cell; the procedure would succeed as long as the target cell is either prepared (forward preparation) or able to retrieve the UE context (backwards fetch). Forward preparation of the target cell is part of existing handover preparation procedures. However, this procedure won't be triggered if there is no handover occurring (e.g. no measurement report in this solution). Backwards fetch of UE context needs to be supported between two eNodeBs. One possibility is the reuse of the RLF indication message; however, this procedure is not supported in existing specifications. The use of a radio link failure indication for this purpose should be further confirmed by RAN3.

Figure 9:
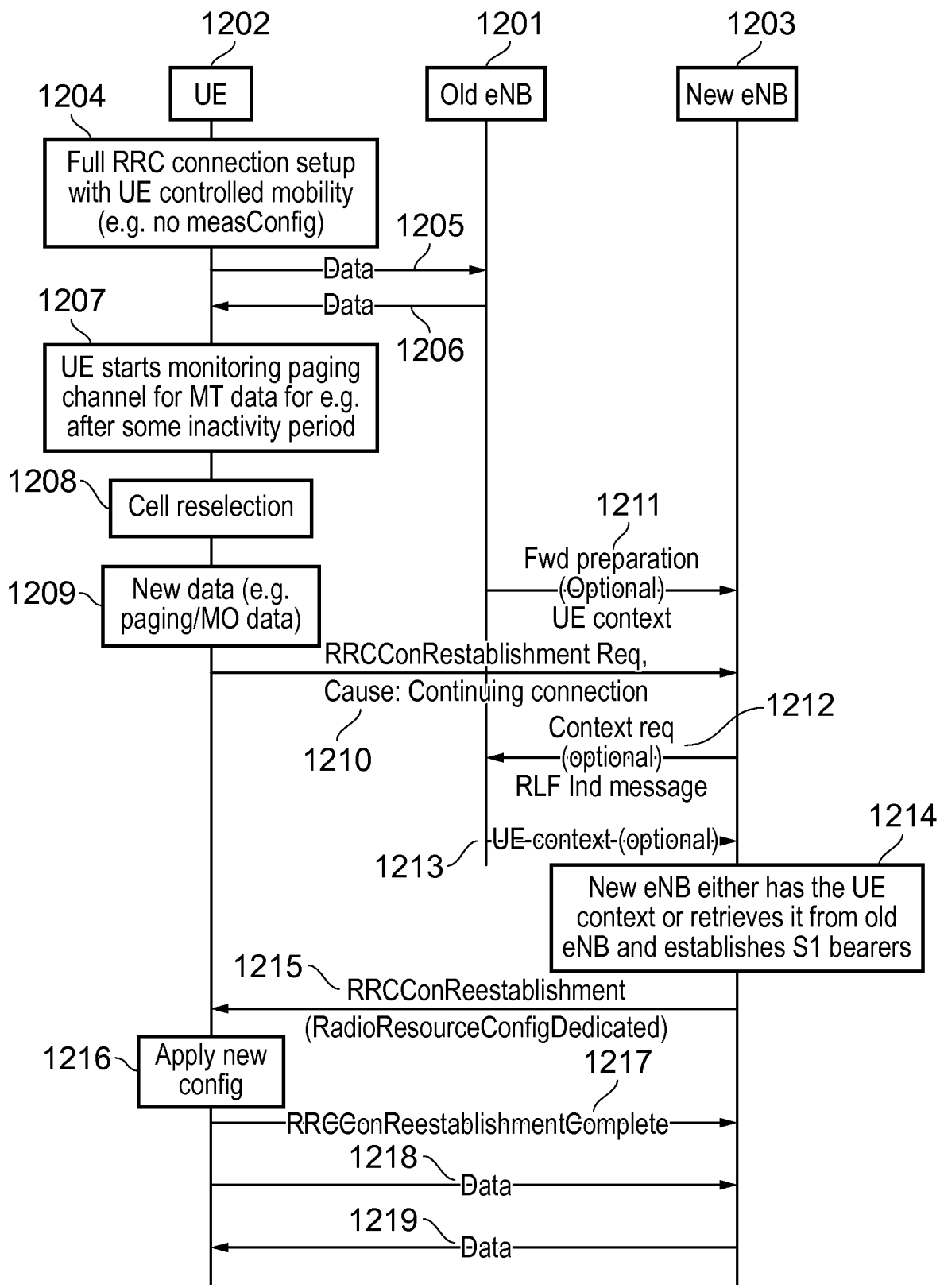
FIG. 9 illustrates an example of a signalling sequence to resume a data radio bearer (DRB) upon cell reselection in accordance with the present technique.

FIG. 9 demonstrates the solution provided by Release 12. A UE 1202 may be in an idle mode, and controlling its own mobility, and therefore not be generating any measurement information, and may set up a connection 1204 with an eNodeB 1201, to which it can transmit 1205 and receive 1206 data. After a period of inactivity, the UE 1202 may start monitoring a paging channel 1207 for MT data, and it may be the case that it decides to manage a cell reselection procedure 1208.

The UE 1202 may have some new data that it needs to transmit 1209, and so requests a connection to a new eNodeB 1203. To avoid signalling overheads, the new eNodeB may have received context information regarding the UE 1202 from the old eNodeB 1201 in the form of forward preparation 1211, or else the new eNodeB 1203 may request the context information regarding the UE 1202 from the old eNodeB 1201 as a backwards fetch 1212, at which point the old eNodeB 1201 will transmit 1213 the context information regarding the UE 1202 to the new eNodeB 1203. In which ever way this context information is received by the new eNodeB 1203, it then establishes S1 data bearers 1214, and forms a connection 1215 with the UE 1202. The UE 1202 must apply new configuration data 1216 for this connection, and will confirm the connection 1217 to the new eNodeB 1203, at which point the UE 1202 will be able to transmit data to 1218 and receive data from 1219 the new eNodeB 1203.

During the re-establishment procedure, the UE gets all the necessary information to recalculate the security keys and the nextHopChainingCount value (for subsequent cell changes) in the RRCConnectionReestablishment message. Thus, with this solution, the sending of the security mode command (which is one of the largest signalling messages exchanged during connection setup) is avoided after cell change. It should also be noted that in this case a RRC Reconfiguration message may not be necessary if the DRB is not suspended, unlike in re-establishment procedure due to e.g. radio link failure or handover failure. This however assumes that a number of changes are necessary for the re-establishment procedure and that these changes need to be supported by both the eNB and the UE, i.e. the re-establishment of SRB2 and DRB through the RRC Connection Reestablishment message.

In case of very infrequent data transmission, the UE may be subjected to more cell reselections than data transmission occasions. In this scenario, it would be beneficial if the UE would attempt the RRC Reestablishment procedure as proposed above only upon a need for new data transmission (i.e. either new MO data or paging). In other words, this would also mean that the UE would be only listening to downlink paging channels for MT data in connected mode (i.e. the network could potentially at this point tear down the S1-U connection). This would also minimise the mean power consumption at the UE (i.e. same as idle mode power consumption).

The techniques disclosed in the present invention are advantageous in that they allow the type of mobility to be configured by the network, depending not only on whether eDRX is used, but depending on the length of the DRX cycle, or an amount of time or number of eDRX cycles spent in eDRX. For example, some lower values of eDRX length might still be acceptable for completing handover with a reasonable success rate, whereas longer values may not. A further advantage is that this proposal allows for the reduction of signalling (e.g. handover signalling) in the case of mobility when eDRX is used. Additionally, this also allows further power saving on longer DRX cycle lengths or eDRX duration.

In the present disclosure, the term infrastructure unit aims to refer to any network node in the radio access network which can be found on the part from a source terminal (excluded) to a base station (included). It is noteworthy that although conventional terminals operating in a legacy network are unlikely to be considered as an infrastructure unit, in some examples, such as in some D2D cases, a terminal may sometimes be considered as an infrastructure unit, for example if it relays data or transmissions from other terminals to a base station (directly or indirectly). This term can thus include a base station for a macrocell, a base station for a small cell, a femtocell, a picocell, a relay node (operating in uplink and/or downlink), a terminal providing connectivity to one or more further terminals, etc.

As used herein, transmitting information or a message to an element may involve sending one or more messages to the element and may involve sending part of the information separately from the rest of the information. The number of "messages" involved may also vary depending on the layer or granularity considered.

In accordance with the present disclosure, when an uplink only relay node relays uplink signals, it may transmit relayed signals to the base station via one or more nodes (where the relayed signals are based on the received first uplink signals). For example, the signals may be transmitted to the base station via one or more relay nodes where some or all of them may be operating in one of an uplink-only mode or an uplink-and-downlink mode.

It is noteworthy that even though the present disclosure has been discussed in the context of LTE, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard.

The following numbered clauses define further aspects and features of the present technique:

Paragraph 1. A communications terminal forming part of a mobile communications network comprising one or more infrastructure equipment, the communications terminal comprising a transmitter configured to transmit signals via a wireless access interface to the one or more infrastructure equipment, a receiver configured to receive signals via the wireless access interface from the one or more infrastructure equipment, and a controller configured to control the transmitter and the receiver to transmit and to receive data via the wireless access interface when in a connected mode, wherein the controller is configured in combination with the transmitter and the receiver when in the connected mode to control the receiver to operate in accordance with a discontinuous reception, DRX, state, to measure, when in a re-selection mobility management mode of the DRX state, signals received by the receiver from any of the one or more infrastructure equipment, and to select, based on the measured signals received by the receiver from any of the one or more infrastructure equipment, one of the one or more infrastructure equipment from which to receive signals transmitted on the downlink, to measure, when in a network controlled mobility management mode of the DRX state, signals received by the receiver from any of the one or more infrastructure equipment, to generate measurement information based on the measured signals received by the receiver from any of the one or more infrastructure equipment, and to control the transmitter to transmit the measurement information to the one of the infrastructure equipment, wherein the controller is configured in combination with the receiver when in the network controlled mobility management mode of the DRX state after predetermined conditions have been satisfied to switch to the re-selection mobility management mode of the DRX state.

Paragraph 2. A communications terminal according to paragraph 1, comprising a duration timer wherein the predetermined conditions include the communications terminal being in the DRX state for greater than a first predetermined period.

Paragraph 3. A communications terminal according to paragraph 2, wherein the controller is configured to detect that the communications terminal has entered the DRX state, to start the duration timer, to detect that the duration timer has exceeded the first predetermined period, and to switch from the network controlled mobility management state to the re-selection mobility management mode.

Paragraph 4. A communications terminal according to paragraph 1, 2 or 3, wherein the DRX state comprises a long DRX state and an enhanced discontinuous reception, eDRX, state, wherein the receiver is configured to monitor for signals transmitted by the one or more infrastructure equipment on the downlink for a predetermined period for each cycle of the eDRX state and for each cycle of the long DRX state, where a temporal length of the eDRX cycle is greater than a temporal length of the long DRX cycle and the predetermined conditions include the communications terminal entering the eDRX state for one or more eDRX cycles.

Paragraph 5. A communications terminal according to paragraph 1, 2, 3 or 4, wherein the DRX state comprises a long DRX state and an enhanced discontinuous reception, eDRX, state, wherein the receiver is configured to monitor for signals transmitted by the one or more infrastructure equipment on the downlink for a predetermined period for each cycle of the eDRX state and for each cycle of the long DRX state, where a temporal length of the eDRX cycle is greater than a temporal length of the long DRX cycle and the predetermined conditions include the eDRX cycle being greater than a second predetermined period.

Paragraph 6. A communications terminal according to paragraph 4 or 5, wherein the receiver is configured to receive an indication of the temporal length of the long DRX cycle and the temporal length of the eDRX cycle from a network controller.

Paragraph 7. A communications terminal according to paragraph 4 or 5, wherein the controller is configured to negotiate the temporal length of the long DRX cycle and the temporal length of the eDRX cycle with the network controller.

Paragraph 8. A communications terminal according to paragraph 4, wherein the number of eDRX cycles is configured in system information, wherein the receiver is configured to receive the system information from the one of the infrastructure equipment.

Paragraph 9. A communications terminal according to paragraph 5, wherein the second predetermined period is configured in system information, wherein the receiver is configured to receive the system information from the one of the infrastructure equipment.

Paragraph 10. A communications terminal according to any of paragraphs 1 to 9, wherein the DRX cycle comprises an active period in which the receiver monitors for signals received from the infrastructure equipment and a period when the receiver does not need to monitor signals received from the infrastructure equipment.

Paragraph 11. A communications terminal according to paragraph 1, wherein when in the re-selection mobility management mode of the DRX state after second predetermined conditions have been satisfied to switch to the network controlled mobility management mode of the DRX state.

Paragraph 12. A communications terminal according to paragraph 1, wherein the selecting of the one of the infrastructure equipment from which to receive signals transmitted on the downlink comprises the one of the infrastructure equipment being a different one of the infrastructure equipment to a second one of the infrastructure equipment from which the communications terminal last received signals transmitted on the downlink.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

REFERENCES

[1] 3GPP TR36.872 V12.1.0, "Small cell enhancements for E-UTRA and E-UTRAN—Physical Layer aspects", December 2013.
[2] LTE for UMTS: OFDMA and SC-FDMA Based Radio Access, Harris Holma and Antti Toskala, Wiley 2009, ISBN 978-0-470-99401-6.
[3] Holma H. and Toskala A., "LTE for UMTS OFDMA and SC-FDMA Based Radio Access", John Wiley & Sons Limited, January 2010.
[4] Qualcomm Incorporated, "RAN enhancements for extended DRX in LTE", March 2015
[5] Qualcomm Incorporated, "Design considerations for extended DRX in LTE", May 2015
[6] 3GPP, "3GPP Green activities/Energy saving V0.1.0", September 2012.
[7] 3GPP, "Study on Enhancements to MTC and other Mobile Data Applications; RAN aspects (Release 12)", September 2013.

The invention claimed is:

1. A communications terminal forming part of a mobile communications network comprising one or more infrastructure equipment, the communications terminal comprising a transmitter configured to transmit signals via a wireless access interface to the one or more infrastructure equipment, a receiver configured to receive signals including a threshold DRX cycle length via the wireless access interface from the one or more infrastructure equipment, and a controller configured to control the transmitter and the receiver to transmit and to receive data via the wireless access interface when in a connected mode, wherein the controller is configured in combination with the transmitter and the receiver when in the connected mode to control the receiver to operate in accordance with a discontinuous reception, DRX, state, to measure, when in a re-selection mobility management mode of the DRX state, signals received by the receiver from any of the one or more infrastructure equipment, and to select, based on the measured signals received by the receiver from any of the one or more infrastructure equipment, one of the one or more infrastructure equipment from which to receive signals transmitted on the downlink, to measure, when in a network controlled mobility management mode of the DRX state, signals received by the receiver from any of the one or more infrastructure equipment, to generate measurement information based on the measured signals received by the receiver from any of the one or more infrastructure equipment, and to control the transmitter to transmit the measurement information to the one of the infrastructure equipment, wherein the controller is configured in combination with the receiver when in the network controlled mobility management mode of the DRX state after first predetermined conditions have been satisfied to switch to the re-selection mobility management mode of the DRX state, when in the re-selection mobility management mode of the DRX state after second predetermined conditions have been satisfied to switch to the network controlled mobility management mode of the DRX state, wherein the DRX state comprises a long DRX state and an enhanced discontinuous reception, eDRX, state, wherein the receiver is configured to monitor for signals transmitted by the one or more infrastructure equipment on the downlink for a predetermined period for each cycle of the eDRX state and for each cycle of the long DRX state, where a temporal length of the eDRX cycle is greater than a temporal length of the long DRX cycle, and wherein when the length of the eDRX cycle is less than the received threshold DRX cycle length to switch to a normal connected mode.

2. A communications terminal as claimed in claim 1, comprising a duration timer wherein the first predetermined conditions include the communications terminal being in the DRX state for greater than a first predetermined period.

3. A communications terminal as claimed in claim 2, wherein the controller is configured to detect that the communications terminal has entered the DRX state, to start the duration timer, to detect that the duration timer has exceeded the first predetermined period, and to switch from the network controlled mobility management state to the re-selection mobility management mode.

4. A communications terminal as claimed in claim 1, wherein the first predetermined conditions include the communications terminal entering the eDRX state for one or more eDRX cycles.

5. A communications terminal as claimed in claim 1, wherein the first predetermined conditions include the eDRX cycle being greater than a second predetermined period.

6. A communications terminal as claimed in claim 5, wherein the receiver is configured to receive an indication of the temporal length of the long DRX cycle and the temporal length of the eDRX cycle from a network controller.

7. A communications terminal as claimed in claim 5, wherein the controller is configured to negotiate the temporal length of the long DRX cycle and the temporal length of the eDRX cycle with the network controller.

8. A communications terminal as claimed in claim 4, wherein the number of eDRX cycles is configured in system information, wherein the receiver is configured to receive the system information from the one of the infrastructure equipment.

9. A communications terminal as claimed in claim 5, wherein the second predetermined period is configured in system information, wherein the receiver is configured to receive the system information from the one of the infrastructure equipment.

10. A communications terminal as claimed in claim 1, wherein the DRX cycle comprises an active period in which the receiver monitors for signals received from the infrastructure equipment and a period when the receiver does not need to monitor signals received from the infrastructure equipment.

11. A communications terminal as claimed in claim 1, wherein the selecting of the one of the infrastructure equipment from which to receive signals transmitted on the downlink comprises the one of the infrastructure equipment being a different one of the infrastructure equipment to a second one of the infrastructure equipment from which the communications terminal last received signals transmitted on the downlink.

12. A method of controlling a communications terminal forming part of a mobile communications network comprising one or more infrastructure equipment, the method comprising receiving at a receiver of the communications terminal signals including a threshold DRX cycle length, controlling, when in a connected mode, the receiver of the communications terminal to operate in accordance with a discontinuous reception, DRX, state, measuring, when in a re-selection mobility management mode of the DRX state, signals received by the receiver from any of the one or more infrastructure equipment, and selecting, based on the measured signals received by the receiver from any of the one or more infrastructure equipment, one of the one or more infrastructure equipment from which to receive signals transmitted on the downlink, measuring, when in a network controlled mobility management mode of the DRX state, signals received by the receiver from any of the one or more infrastructure equipment, generating measurement information based on the measured signals received by the receiver from any of the one or more infrastructure equipment, controlling a transmitter of the communications terminal to transmit the measurement information to the one of the infrastructure equipment, switching, when in the network controlled mobility management mode of the DRX state after first predetermined conditions have been satisfied, to the re-selection mobility management mode of the DRX state, and switching, when in the re-selection mobility management mode of the DRX state after second predetermined conditions have been satisfied, to the network controlled mobility management mode of the DRX state, wherein the DRX state comprises a long DRX state and an enhanced discontinuous reception, eDRX, state, wherein the receiver is configured to monitor for signals transmitted by the one or more infrastructure equipment on the downlink for a predetermined period for each cycle of the eDRX state and for each cycle of the long DRX state, where a temporal length of the eDRX cycle is greater than a temporal length of the long DRX cycle, and wherein, when the length of the eDRX cycle is less than the received threshold DRX cycle length, switching to a normal connected mode.

13. Circuitry for a communications terminal forming part of a mobile communications network comprising one or more infrastructure equipment, the communications terminal comprising a transmitter configured to transmit signals via a wireless access interface to the one or more infrastructure equipment, a receiver configured to receive signals including a threshold DRX cycle length via the wireless access interface from the one or more infrastructure equipment, and a controller configured to control the transmitter and the receiver to transmit and to receive data via the wireless access interface when in a connected mode, wherein the controller is configured in combination with the transmitter and the receiver when in the connected mode to control the receiver to operate in accordance with a discontinuous reception, DRX, state, to measure, when in a re-selection mobility management mode of the DRX state, signals received by the receiver from any of the one or more infrastructure equipment, and to select, based on the measured signals received by the receiver from any of the one or more infrastructure equipment, one of the one or more infrastructure equipment from which to receive signals transmitted on the downlink, to measure, when in a network controlled mobility management mode of the DRX state, signals received by the receiver from any of the one or more infrastructure equipment, to generate measurement information based on the measured signals received by the receiver from any of the one or more infrastructure equipment, and to control the transmitter to transmit the measurement information to the one of the infrastructure equipment, wherein the controller is configured in combination with the receiver when in the network controlled mobility management mode of the DRX state after first predetermined conditions have been satisfied to switch to the re-selection mobility management mode of the DRX state, when in the re-selection mobility management mode of the DRX state after second predetermined conditions have been satisfied to switch to the network controlled mobility management mode of the DRX state, wherein the DRX state comprises a long DRX state and an enhanced discontinuous reception, eDRX, state, wherein the receiver is configured to monitor for signals transmitted by the one or more infrastructure equipment on the downlink for a predetermined period for each cycle of the eDRX state and for each cycle of the long DRX state, where a temporal length of the eDRX cycle is greater than a temporal length of the long DRX cycle, and wherein when the length of the eDRX cycle is less than the received threshold DRX cycle length to switch to a normal connected mode.

* * * * *